(12) United States Patent
Outwater et al.

(10) Patent No.: US 11,217,053 B2
(45) Date of Patent: *Jan. 4, 2022

(54) ACCESS CONTROL SYSTEM AND METHOD FOR USE BY AN ACCESS DEVICE

(71) Applicant: Liberty PlugIns, Inc., Santa Barbara, CA (US)

(72) Inventors: Chris Outwater, Carpinteria, CA (US); William Gibbens Redmann, Glendale, CA (US)

(73) Assignee: Urban Intel, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/847,719

(22) Filed: Apr. 14, 2020

(65) Prior Publication Data

US 2020/0288318 A1 Sep. 10, 2020

Related U.S. Application Data

(63) Continuation of application No. 16/034,278, filed on Jul. 12, 2018, now Pat. No. 10,657,747, which is a
(Continued)

(51) Int. Cl.
*G07C 9/00* (2020.01)
*G07C 9/27* (2020.01)
(Continued)

(52) U.S. Cl.
CPC ............ *G07C 9/27* (2020.01); *B60L 53/14* (2019.02); *B60L 53/16* (2019.02); *B60L 53/18* (2019.02);
(Continued)

(58) Field of Classification Search
None
See application file for complete search history.

(56) References Cited

U.S. PATENT DOCUMENTS

| 3,742,453 A | 6/1973 | Poylo |
| 5,933,085 A | 8/1999 | Holcomb et al. |

(Continued)

FOREIGN PATENT DOCUMENTS

| EP | 1783694 B1 | 2/2011 |
| GB | 2364202 A | 1/2002 |

(Continued)

OTHER PUBLICATIONS

The Institute of Electrical and Electronics Engineers, Inc., "IEEE Standard for Information Technology—Telecommunications and information exchange between systems—Local and metropolitan area networks—Specific Requirements, Part 11: Wireless LAN Medium Access Conlrol (MAC) and Physical Layer (PHY) Specifications" copyright 2007, printed in the United States of America.

(Continued)

*Primary Examiner* — Brandon S Hoffman
(74) *Attorney, Agent, or Firm* — John R. Kasha; Kelly L. Kasha; Kasha Law LLC

(57) ABSTRACT

Systems and methods are provided to allow a smart phone or any terminal to activate a door lock using a web site or server computer system. An access control system is provided that includes a server and an access device. The access device includes a processor and a communication module. The process has control of a door lock and is able to receive a reservation certificate presented by a portable terminal through the communication module. The processor activates the door lock when a current reservation certificate has been presented.

20 Claims, 7 Drawing Sheets

Related U.S. Application Data continuation of application No. 15/609,055, filed on May 31, 2017, now Pat. No. 10,049,514, which is a continuation of application No. 15/178,849, filed on Jun. 10, 2016, now Pat. No. 9,911,258, which is a continuation of application No. 14/603,434, filed on Jan. 23, 2015, now Pat. No. 9,373,205, which is a continuation of application No. 13/582,467, filed as application No. PCT/US2011/026781 on Mar. 2, 2011, now Pat. No. 8,996,876.

(60) Provisional application No. 61/309,813, filed on Mar. 2, 2010.

(51) Int. Cl.
| | |
|---|---|
| *H04W 4/021* | (2018.01) |
| *H04W 4/02* | (2018.01) |
| *G06Q 20/04* | (2012.01) |
| *G06Q 20/32* | (2012.01) |
| *G06Q 20/38* | (2012.01) |
| *G06Q 30/06* | (2012.01) |
| *G07F 5/26* | (2006.01) |
| *G07F 15/00* | (2006.01) |
| *H04L 9/32* | (2006.01) |
| *H04L 29/06* | (2006.01) |
| *H04W 12/08* | (2021.01) |
| *B60L 53/65* | (2019.01) |
| *B60L 53/66* | (2019.01) |
| *B60L 53/68* | (2019.01) |
| *B60L 53/16* | (2019.01) |
| *B60L 53/31* | (2019.01) |
| *B60L 53/18* | (2019.01) |
| *B60L 53/57* | (2019.01) |
| *G07C 9/20* | (2020.01) |
| *G07C 9/29* | (2020.01) |
| *B60L 53/14* | (2019.01) |
| *B60L 53/30* | (2019.01) |
| *H04M 1/72412* | (2021.01) |
| *H04W 12/069* | (2021.01) |
| *G06Q 10/02* | (2012.01) |
| *G06Q 50/06* | (2012.01) |
| *H04W 4/40* | (2018.01) |

(52) U.S. Cl.
CPC ............... *B60L 53/30* (2019.02); *B60L 53/31* (2019.02); *B60L 53/57* (2019.02); *B60L 53/65* (2019.02); *B60L 53/665* (2019.02); *B60L 53/68* (2019.02); *G06Q 10/02* (2013.01); *G06Q 20/045* (2013.01); *G06Q 20/32* (2013.01); *G06Q 20/322* (2013.01); *G06Q 20/3223* (2013.01); *G06Q 20/3278* (2013.01); *G06Q 20/3829* (2013.01); *G06Q 20/38215* (2013.01); *G06Q 30/06* (2013.01); *G06Q 50/06* (2013.01); *G07C 9/20* (2020.01); *G07C 9/29* (2020.01); *G07F 5/26* (2013.01); *G07F 15/005* (2013.01); *H04L 9/3247* (2013.01); *H04L 9/3263* (2013.01); *H04L 9/3268* (2013.01); *H04L 63/0428* (2013.01); *H04L 63/0823* (2013.01); *H04L 63/102* (2013.01); *H04M 1/72412* (2021.01); *H04W 4/021* (2013.01); *H04W 4/023* (2013.01); *H04W 12/069* (2021.01); *H04W 12/08* (2013.01); *B60L 2240/622* (2013.01); *B60L 2240/72* (2013.01); *B60L 2240/80* (2013.01); *B60L 2250/10* (2013.01); *G06Q 2240/00* (2013.01); *H04L 63/0442* (2013.01); *H04L 2209/56* (2013.01); *H04L 2209/80* (2013.01); *H04L 2209/84* (2013.01); *H04W 4/40* (2018.02); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01); *Y02T 90/167* (2013.01); *Y04S 30/14* (2013.01)

(56) References Cited

U.S. PATENT DOCUMENTS

| | | | |
|---|---|---|---|
| 6,233,577 B1 * | 5/2001 | Ramasubramani | ..... H04L 29/06 |
| 6,950,808 B1 | 9/2005 | Kyojima et al. | |
| 6,975,202 B1 | 12/2005 | Rodriguez et al. | |
| 7,012,503 B2 | 3/2006 | Nielsen | |
| 7,114,178 B2 | 9/2006 | Dent et al. | |
| 7,114,179 B1 | 9/2006 | Ritter et al. | |
| 7,170,998 B2 | 1/2007 | McLintock et al. | |
| 7,196,610 B2 | 3/2007 | Straumann et al. | |
| 7,209,029 B2 | 4/2007 | Coelho et al. | |
| 7,315,823 B2 | 1/2008 | Brondrup | |
| 7,457,418 B2 | 11/2008 | Bunte et al. | |
| 7,706,778 B2 | 4/2010 | Lowe | |
| 8,730,004 B2 | 5/2014 | Elfstrom et al. | |
| 2002/0031228 A1 | 3/2002 | Karkas et al. | |
| 2002/0099945 A1 | 7/2002 | McLintock et al. | |
| 2002/0100803 A1 * | 8/2002 | Sehr | ..... G06Q 10/02 |
| | | | 235/384 |
| 2002/0180582 A1 | 12/2002 | Nielsen | |
| 2003/0016828 A1 | 1/2003 | Bunte et al. | |
| 2003/0151493 A1 | 8/2003 | Straumann et al. | |
| 2003/0208386 A1 | 11/2003 | Brondrup | |
| 2004/0025039 A1 | 2/2004 | Kuenzi et al. | |
| 2004/0059815 A1 | 3/2004 | Buckingham et al. | |
| 2005/0241003 A1 | 10/2005 | Sweeney et al. | |
| 2006/0072755 A1 | 4/2006 | Oskari | |
| 2007/0034691 A1 | 2/2007 | Davis et al. | |
| 2007/0035381 A1 | 2/2007 | Davis | |
| 2007/0126562 A1 | 6/2007 | Ku | |
| 2007/0176739 A1 | 8/2007 | Raheman | |
| 2007/0197261 A1 | 8/2007 | Humbel | |
| 2007/0200665 A1 | 8/2007 | Studerus | |
| 2007/0290789 A1 | 12/2007 | Segev et al. | |
| 2008/0024272 A1 | 1/2008 | Fiske | |
| 2008/0148369 A1 | 6/2008 | Aaron | |
| 2009/0066476 A1 | 3/2009 | Raheman | |
| 2009/0136035 A1 | 5/2009 | Lee | |
| 2009/0183541 A1 | 7/2009 | Sadighi et al. | |
| 2009/0184801 A1 | 7/2009 | Bliding et al. | |
| 2010/0141381 A1 | 6/2010 | Bliding et al. | |
| 2010/0176919 A1 | 7/2010 | Myers et al. | |
| 2010/0191551 A1 | 7/2010 | Drance et al. | |
| 2010/0201536 A1 | 8/2010 | Robertson | |
| 2011/0001603 A1 | 1/2011 | Willis | |
| 2011/0112969 A1 | 5/2011 | Zaid et al. | |

FOREIGN PATENT DOCUMENTS

| | | |
|---|---|---|
| JP | 2002125266 | 4/2002 |
| KR | 1020070012735 A | 5/2005 |
| KR | 1020020087057 A | 3/2007 |
| WO | 2005080720 A1 | 9/2005 |
| WO | 2008076074 A1 | 6/2008 |

OTHER PUBLICATIONS

The Institute of Electrical and Electronics Engineers, Inc., "IEEE Standard for Information Technology—Telecommunications and information exchange between systems—Local and metropolitan area networks—Specific Requirements, Part 11: Wireless LAN Medium Access Conlrol (MAC) and Physical Layer (PHY) Specifications, Amendment 2: Fast Basic Service Set (BSS) Transition" copyright 2008, printed in the United States of America.

(56) References Cited

OTHER PUBLICATIONS

LodgingHospitality, "Technically Speaking, How Technology Enhances the Bottom Line, New System Links Cellphones, Lock Systems," LHOnline.com, Jan. 2010.
General Electric, "Supra," http://www.geindustrial.com:80/ge-interlogix/supra/index.html.
Ibrahim, "Authenticating User Ellrance into a Hotel." Research Disclosure database No. 538-24, published in the Feb. 2009 paper journal.

\* cited by examiner

ACCESS CONTROL SYSTEM AND METHOD FOR USE BY AN ACCESS DEVICE

CROSS-REFERENCE TO RELATED APPLICATION

This application is a continuation of U.S. patent application Ser. No. 16/034,278, filed Jul. 12, 2018, now U.S. Pat. No. 10,657,747, which is a continuation of U.S. patent application Ser. No. 15/609,055, filed May 31, 2017, now U.S. patent Ser. No. 10/049,514, which is a continuation of U.S. patent application Ser. No. 15/178,849, filed Jun. 10, 2016, now U.S. Pat. No. 9,911,258, which is a continuation of U.S. patent application Ser. No. 14/603,434, filed Jan. 23, 2015, now U.S. Pat. No. 9,373,205, which is a continuation of U.S. patent application Ser. No. 13/582,467, filed Sep. 4, 2012, now U.S. Pat. No. 8,996,879, which is a national stage application of PCT Application No. PCT/US11/26781, filed Mar. 2, 2011, which claims the benefit of U.S. Provisional Patent Application No. 61/309,813, filed Mar. 2, 2010. All of the above mentioned applications are incorporated by reference herein in their entireties.

INTRODUCTION

Electric vehicles are rapidly gaining in popularity. With these electric vehicles, charge points, or chargers where the vehicle can charge its batteries, will also become ubiquitous. The simplest charger is simply a kiosk or charge station that a vehicle can plug into and charge. A fee or other access may be required to use this kiosk. In other situations, vehicles will be able to be charged at parking facilities, parking meters and even street lamps. Other electronic access devices such as hotel room locks and the like are also gaining in popularity.

A major problem with a random collection of charge stations is that a driver needing charge may have no idea exactly where to find a charging station that can charge his vehicle using the correct voltage and current, and may have no convenient way to reserve a place or make payments for this service. Of course, kiosks and the like can accept credit cards much like gas pumps; however, there still remains the problem of reservations and correct charging parameters.

Use of the Internet for almost everything has also become very common to many people today. A large percentage of fungible goods today are purchased directly from merchants over the Internet. It would be very desirable to have an easily accessed website that could provide reservation services for charges, including directions to the location of a specific charger and could provide correct charging parameters to that charger. This website could interact with a user's cellular telephone to provide an electronic token or certificate that could be temporarily stored in the phone that could be passed on to an access device such as a vehicle charger, hotel room lock or other access system to allow access and provide any necessary parameters.

Burger in U.S. Published Patent Application number 2010/0031043 teaches a portable electronic authorization method for enabling a user interface on a computer operated by a user to cause the memory content of an electronic device distinct from the computer to be modified. Burger teaches using RFID tags to replace each typical document found in a person's wallet or purse. Burger fails to teach enabling a charger for an electronic vehicle.

It would be advantageous to have a system and method of reserving an electrical vehicle charger on a web page and then transferring a token or certificate to a cellular telephone which could then further transfer this token to the charger to authorize charging.

SUMMARY OF THE INVENTION

The present invention relates to the use of a web site and a cellular telephone, preferably a smart phone, to reserve and activate an electric vehicle charger or to activate and allow access to any access device such as a hotel room lock or the like. The web site can be general access or restricted access and can allow a user using a browser from a computer, laptop, web-capable cellular telephone, smart phone or any electronic processing device to place a reservation for a particular charger at a particular time window. A server or server computer not hosting a website can also interface directly with a telephone application. The server, or another server, can then transfer a digital token or certificate, which may be wholly or partially encrypted, to the cellular telephone. This certificate may comprise a unique ID and/or a date/time stamp.

The certificate generally has an ID referring to the final access device (for example, a charger), or is encoded in such a way that only the final access device can read and/or verify the message (e.g., the certificate may be encrypted with or signed with a public key for the final access device); whereby the final access device can recognize that the certificate is intended for it. The certificate generally has a start time and duration (or end time), describing the interval during which the final access device has been reserved. Additional options may also be included.

The certificate can also contain a digital authorization (for example, a digital signature) so that the final access device can verify that the certificate is genuine. Each charger or other access device in a particular system may have a unique ID, which can be changed for security.

The certificate can also contain this charger or device ID as well as other information such as approximate time when charging should begin (the reservation time), and the charging parameters.

If a wireless device, such as a laptop or smart phone, is used to carry the certificate, it can be running an application that turns on short-range wireless capability as the reservation time approaches. For simplicity in the following discussion, the term ' smart phone' is used, but will be understood to include any portable computer or PDA, having a wireless communication ability.

As the smart phone approaches the charger or access device, a wireless connection is made (e.g., via Bluetooth™, Zigbee™, or IRDA); notification may be provided to the user of the device's proximity; and the wireless device sends the digital token or certificate to the device. The device can be optionally Internet enabled; however, it does not have to necessarily be. In fact, the present invention is particularly useful for devices that may generally be Internet connected, but for which the connection is unreliable, for example, for chargers employing Wi-Fi connection in a garage or private residence. In such cases, an inopportunely placed truck may block communication, or a weakly secured or informally managed modem and/or router may not provide a sufficiently reliable communication. When the device sees its current unique ID on the received certificate or if the device's private key is usable to decrypt at least a portion of the received certificate, and if the reservation time from the certificate approximately agrees with its internal time-of-day/date clock, the device can allow charging. Communication with the smart phone may also include a message as to the smart phone's own clock-calendar, which may be taken into account for adjusting the clock of the device (as the smart phone may have had more recent connection to an authoritative time source.)

The incoming digital certificate can contain a new, updated unique ID for that charger or access device to assume. Upon assuming the new ID (after charging is complete or access is allowed), the old ID is no longer valid. This prevents hacking or spoofing the device by trying to use the same certificate twice (say by changing the date/time). The certificate can also contain a new encryption decoding key for the next use. This prevents any decoding of an old or used token or certificate. In this case, since the transaction may not take place (for example, the customer could not find the charger), it is possible for the state of the charger to become ambiguous. It is possible to issue reservations with both the old certificate and the new certificate present simultaneously.

Funds transfer for the access service can be made by the website at the time of reservation from a user's account, from a money transfer service like PAYPAL™ or by receiving funds from a credit card similar to any other e-transaction. In addition, if the charger or access device is web-enabled, the device itself can report back that the charging took place or the access was allowed. Since the digital token or certificate has a reserved charging time, the certificate will die automatically a certain number of minutes or hours after that time in that the charger or access device will no longer allow access based on its time-of-day/date clock.

DESCRIPTION OF THE FIGURES

Attention is now directed to several illustrations that show some of the features of the present invention.

Several illustrations and drawings have been presented to aid in understanding the present invention. The scope of the present invention is not limited to what is shown in the figures.

DESCRIPTION OF THE INVENTION

The present invention allows reservation and activation of an electric vehicle charger or an access device like a hotel room lock from a website via a digital token or certificate sent to a cellular telephone or smart phone.

Figure 1:
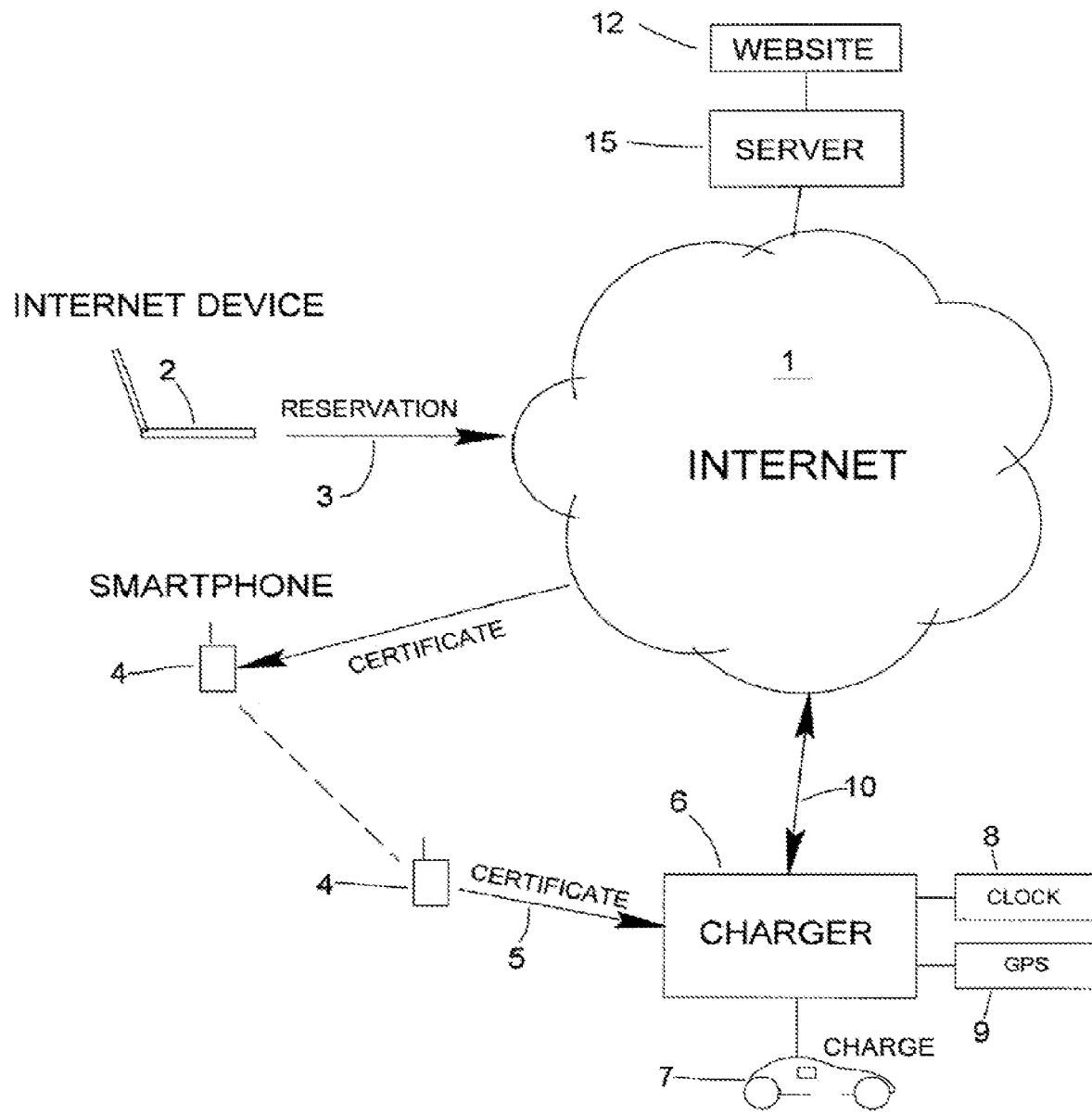
FIG. 1 shows a flow diagram of a reservation and charge from a web-enabled charger.

FIG. 1 shows a flow diagram of an embodiment of the present invention. A website 12 is hosted on a server 15 that communicates with the Internet 1. An Internet terminal device 2 such as a laptop or smart phone has communication with the server 15, browses the site 12 and initiates a reservation request 3 for charging or access. The website can be either open or secure. If secure, then generally a password is needed to access it. Communications security protocols such as https or IPSec may be used in any part of the system of the present invention.

The website 12 or server 15 can contain information about different services available including the location of possible vehicle chargers 6. The website or server will generally have a database which lists all chargers/locations (including possible maintenance closures) and all current reservations along with their status. The user can select where he wants to be charged or can be directed to the nearest charger in the system. The reservation 3 can be let for a certain time when charging will begin on a certain date. The user can also supply any parameters concerning charging necessary such as voltage/current requirements, time needed and the like.

After all of the information is gathered, the website causes the server 15 to send a particular digital token or certificate (a "reservation certificate" 5) to a particular portable terminal, e.g., a cellular telephone or smart phone 4 that the user specifies (which may the phone being used to make the reservation, but it does not need to be). All or part of the digital certificate may be encrypted with a public key for which the private key counterpart is known to only one charger or access device. Similarly, all or part of the digital certificate may be encrypted with a symmetrical key, known to both the server and the charger. All or part of the digital certificate may be encrypted with a private key known only to the server, but for which the public key is known to all compatible chargers, whereby the chargers can authenticate that the encryption was performed by the server. The certificate can contain a unique charger ID code for the target charger 6 or device, the date/time the certificate is issued, the date/time the charging is supposed to take place, the charging parameters, the charging time allocated, a new charger ID code that will replace the old ID, and optionally a new encryption key. Additionally, the certificate can contain communication information necessary to contact the device when in proximity to it, as discussed below. It is also possible that various portions of the message can be in plaintext. This makes it easier for a device to determine if any of many messages is for it without requiring decryption of every message. In this case, part of the certificate should include a hash of portions of the plaintext that would otherwise be exposed to tampering. The hash can then be encrypted by the server (e.g., with the server's private key) so that a charger or device is able to determine the authenticity of the certificate (by decrypting the hash with the server's public key and comparing that hash to one computed from the plaintext).

Figure 3:
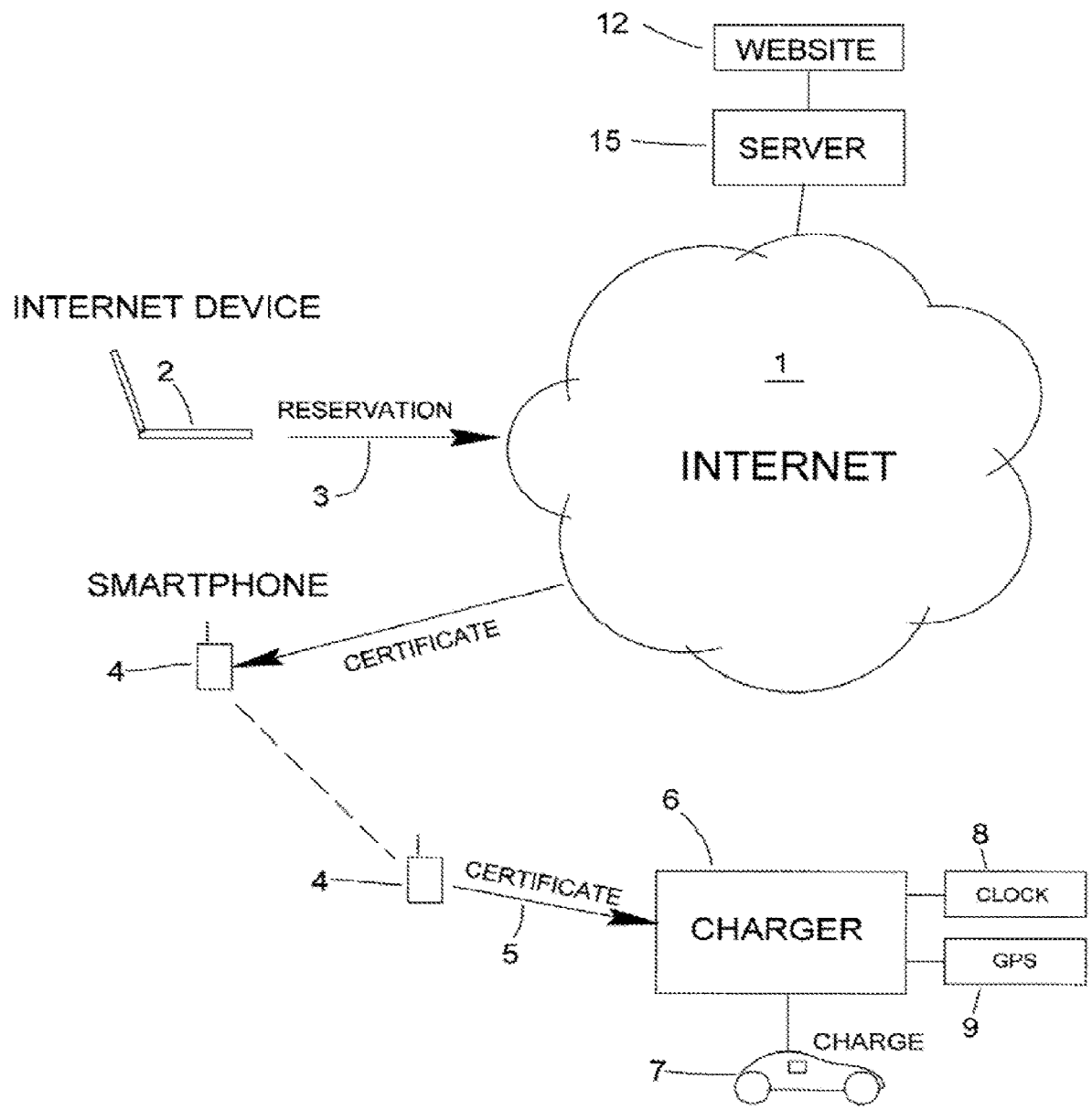
FIG. 3 shows a similar flow diagram to that of FIG. 1, except that the charger is not web-enabled.
Figure 4:
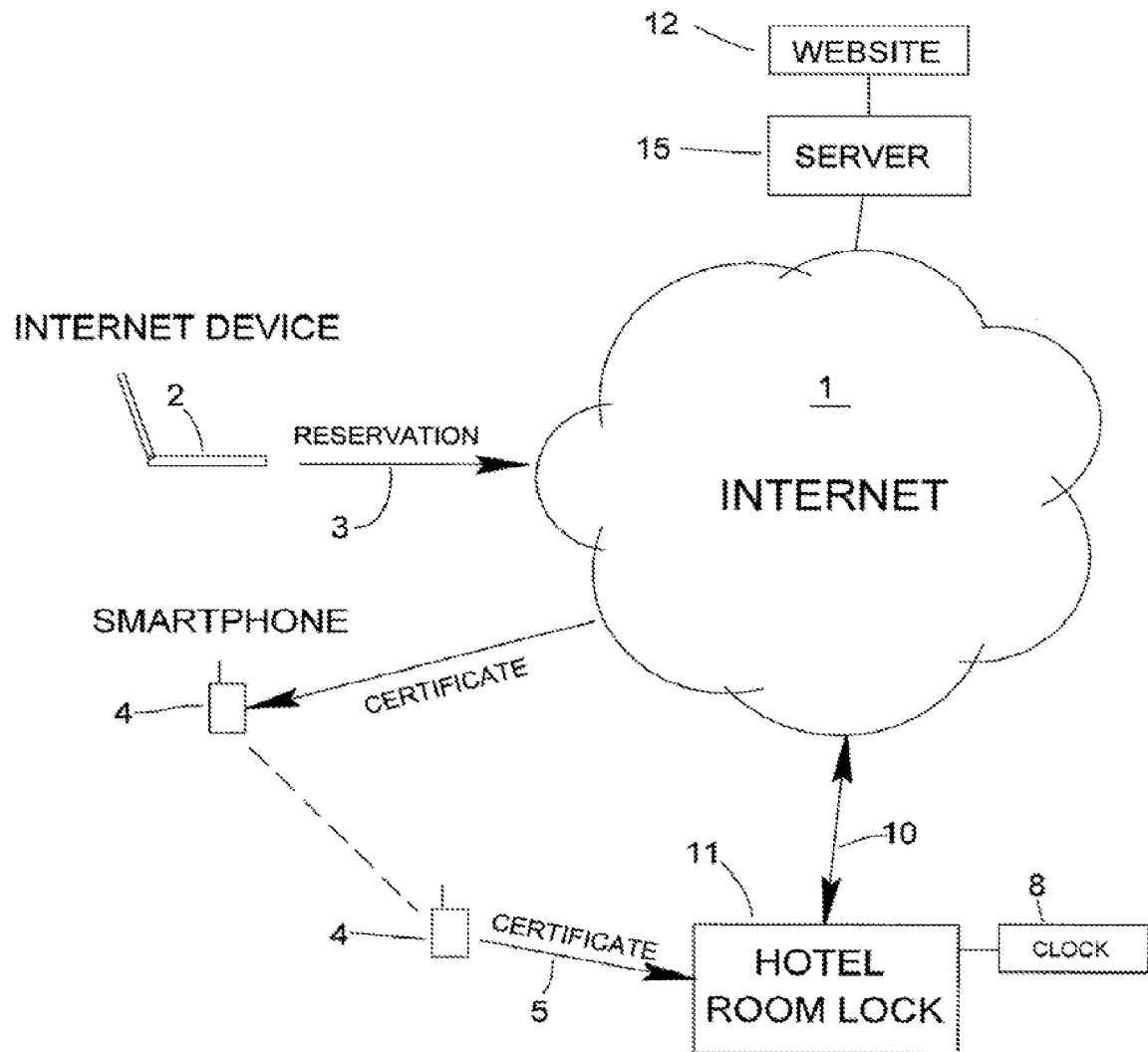
FIG. 4 shows the flow with a web-enabled hotel room lock.
Figure 5:
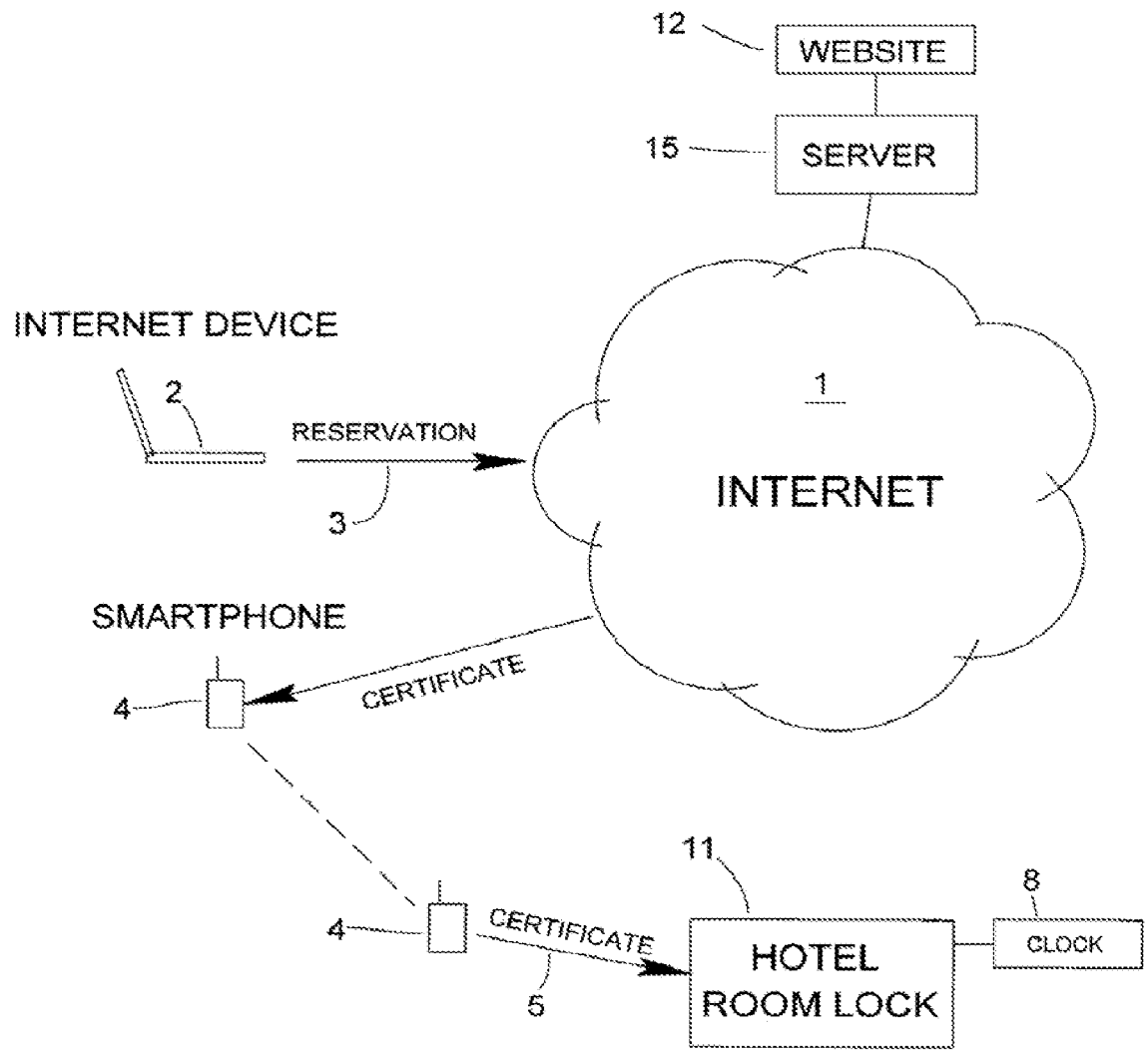
FIG. 5 shows the flow of FIG. 3 with a hotel room lock that is not web-enabled.

The charger 6 (or access device 11, shown in FIG. 4) may be Internet capable, having connection 10 to Internet 1, or optionally it may be unconnected to the Internet 1 (as shown in FIG. 3 and FIG. 5 with no connection 10). As the cellular telephone 4 approaches the charger 6 (or access device 11, shown in FIGS. 4 & 5), a wireless technology such as BLUETOOTH, Wi-Fi, Zigbee, infrared, or other wireless technique can be used to communicate with the charger or access device.

The charger may use these wireless techniques in a manner that does not advertise its presence, for instance, the BLUETOOTH service may not announce itself. In such cases as these, the application on the smart phone uses a predetermined communication setting, or obtains the appropriate communications settings (such as the network SSID, passcodes, IP addresses, Bluetooth ID, etc.) needed to contact the charger. In fact, with certain information (e.g., the Bluetooth ID) will allow the application to identify and communicate with a specific one of many chargers in proximity.

After a short communications handshake, the digital token or certificate 5 is sent to the charger or access device by short-range wireless. The charger 6 decrypts the certificate, if encrypted, reads the unique device ID, and decides if it is the correct device. If so, it reads the reservation time. If the reservation time approximately agrees with the time of day read from its internal time-of-day/date clock 8, it then decodes the charge parameters or access parameters, if any, and allows charging or access to take place. FIG. 1 shows a vehicle 7 being charged, and it shows the charger 6 with a time-of-day/date clock 8 and an optional GPS receiver 9. If the charger contains a GPS receiver, its identification can be by location, provided the charger has GPS access. This generally requires clear sky. The known coordinates or location of a charger can also be entered during installation, either from a map or predetermined table or from a GPS carried by an installer. If the charger 6 or access device 11 is Internet enabled (i.e., having connection 10), it can communicate with the website application via long-range wireless such as cellular or by wire access, or it can communicate with an Internet access point by Wi-Fi or the like.

Figure 2:
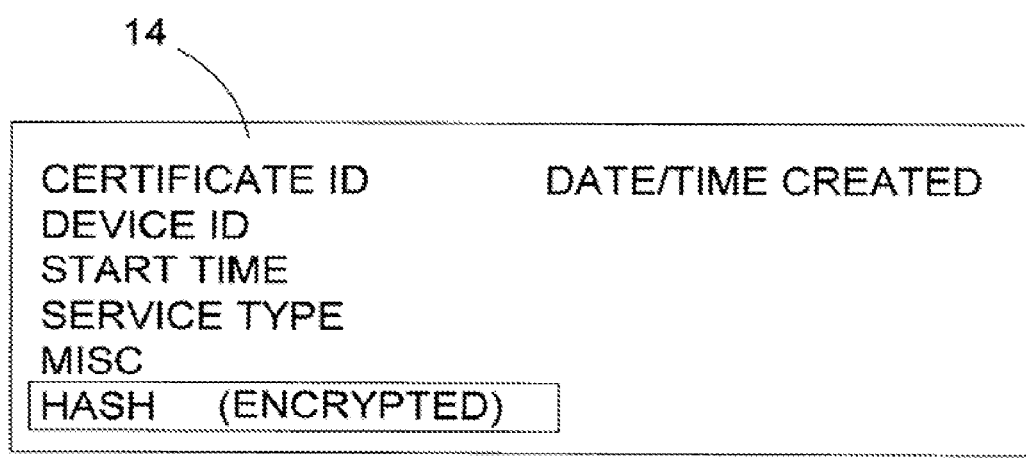
FIG. 2 shows an embodiment of a digital token or certificate.

FIG. 2 shows a sample certificate 14 (one embodiment of certificate 5) containing several fields of data representative of the reservation:

In some embodiments, one field is provided that can associate the certificate with the charger, such as a device identification (Device ID) of the charger 6 (so that the charger will have some suggestion that this is a message for it;

Start Time: this can be in plaintext so that the smart phone application can read it also;

Duration/End Time: if the reservation is not just for a predetermined time like all day for example;

Service Type: for example level 1 charging vs. level 2, if the charger supports multiple services.

For security, in some embodiments, the first portion of the certificate can be hashed, and the hash encrypted using the public key of the charger. Upon receipt by the charger, the hash is decrypted using the private key of the charger, and the hash result compared with the charger's internal hash calculation. If the two match, then nobody has edited the reservation and the certificate may be trusted as authentic. This is safe unless someone cracks the key of the charger. In that case, only one charger 6 is affected. An alternative embodiment may use a signed hash or checksum. Here, the hash is computed as above, then encrypted with a private key held by a trusted authority such as the website.

Upon receipt, anyone, including the smart phone and the charger, can use the trusted authority's public key to decrypt the hash and compare that to the hash they run. This method is safe unless someone cracks the private key of the website. In still another embodiment, a Signed-then-Encrypted Hash/Checksum is used. Here the signed hash is encrypted so that only the charger can read it. This way, the private keys of both the charger 6 and the website server 15 need to be compromised, and then only that charger is threatened.

The certificate 14 can contain a certificate ID that is unique only to this certificate that can be used for tracking and debugging. The date/time the certificate was issued, again for tracking and debugging, a unique device ID of the target device, the reservation start time and duration, any charging parameters needed, an optional new device ID for the next session and an optional new decryption key for the next session.

When charging or access is complete, the charger 6 or access device can update its ID to the new ID supplied by the previous certificate and optionally update its decryption key (if encryption is used). If the charger is Internet capable 10, it can notify the website 12 that the charging is complete or that the changeover has taken place.

FIG. 3 shows the flow of FIG. 1 with the charger 6 not having Internet access. FIG. 4 shows an Internet capable access device 11, in this example a hotel room lock, having connection 10 to Internet 1, while FIG. 5 shows an access device 11 (again a hotel room lock) that cannot communicate over the Internet. In the case of a hotel room, a room reservation can be made using an Internet-enabled cellular telephone 4, laptop 2, computer or other Internet device. The room can be paid for in the usually e-commerce way by credit card or by any other payment method. The digital token or certificate is sent to the smart phone 4, and the user is told the external room number. As the guest approaches the hotel room door, the smart phone 4 sends the certificate 5 to the lock device by way of short-range wireless like BLUETOOTH. The user can then unlock the door at any time during the stay period by pressing a particular button on the phone or by other technique. The phone can re-send the unique (and secret) access device ID to the device so that the device knows it is the correct person each time access is requested.

Figure 6:
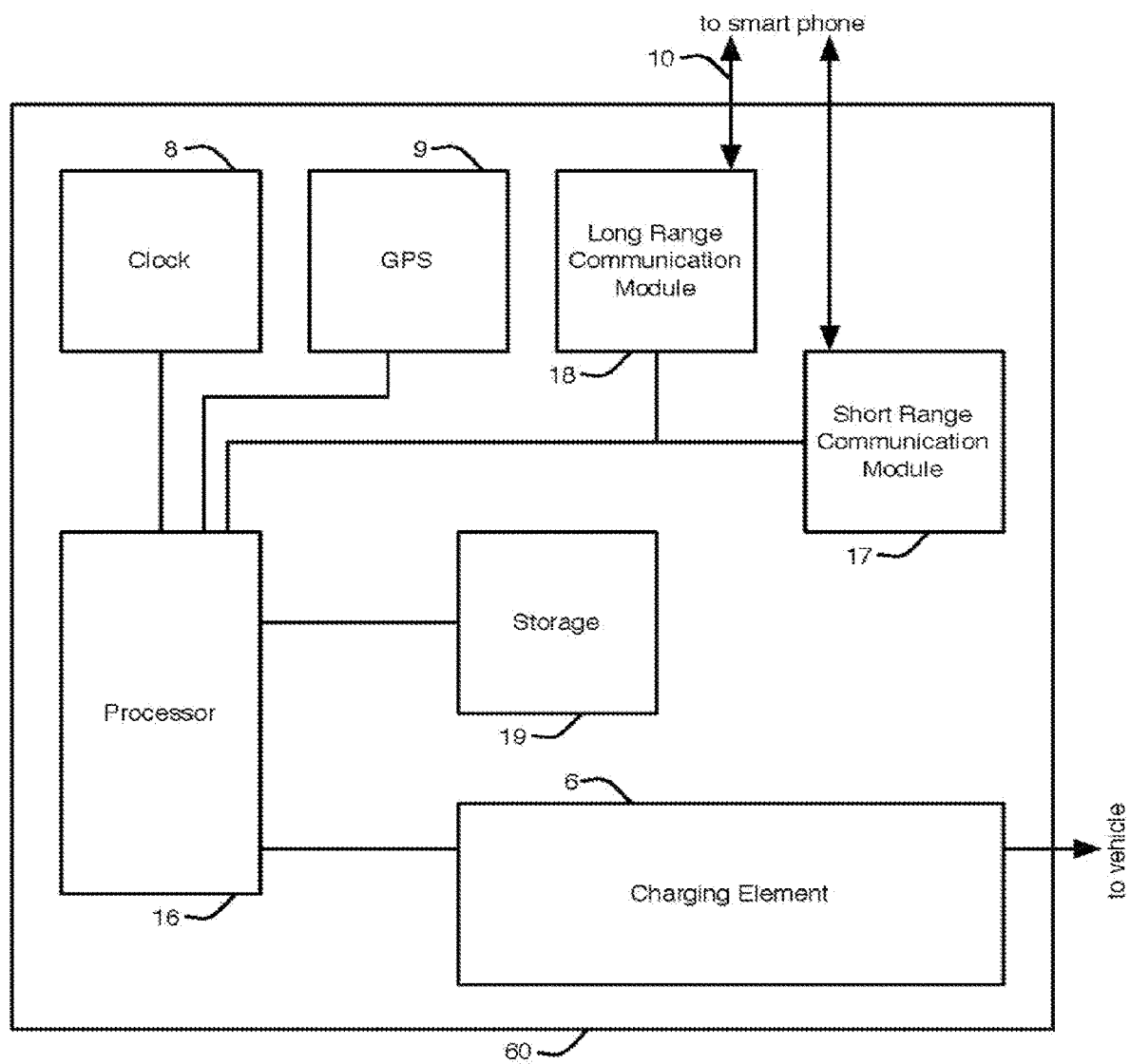
FIG. 6 shows a block diagram of a charger that might be used with the present invention.

FIG. 6 shows a block diagram of a charger system 60 that is an embodiment of the charger of the present invention. A processor 16 is tied to a communication module 17 that performs short-range communication with a cellular telephone or smart phone and allows certificate 5 to be transferred from the cellular/smart phone through processor 16 to a storage module 19. The processor 16 or storage module 19 may comprise the private key for the charger 6 and/or may store a public key (e.g., of server 15) to verify digital signatures (e.g., those made with the server's private key). The storage module 19 can be any type of disk, memory or mass storage device. A clock 8 and/or GPS receiver 9 are also connected to the processor 16 to provide the current time. The processor 16 directly controls access to a charging element 6, i.e., enabling charging element 6 when a currently certificate 5 has been presented, and disabling charging element 6 otherwise. An optional long-range communication module 18 can communicate with the Internet either by placing a cellular telephone call or with Wi-Fi or the like.

Optionally, the application on a smart phone 4 can energize short-range communication when the local GPS in the phone indicates that the phone is near the target charger 6. The smart phone can also optionally signal that the vehicle needs a charge, or that a particular charge reservation time is approaching. The system of the present invention can also optionally track motorists' visits and purchases at retail stores in a mall or shopping center, and have automatic credits that can be added to the smart phone good toward future vehicle charging paid for by merchants as an incentive to purchase from their stores.

Figure 7:
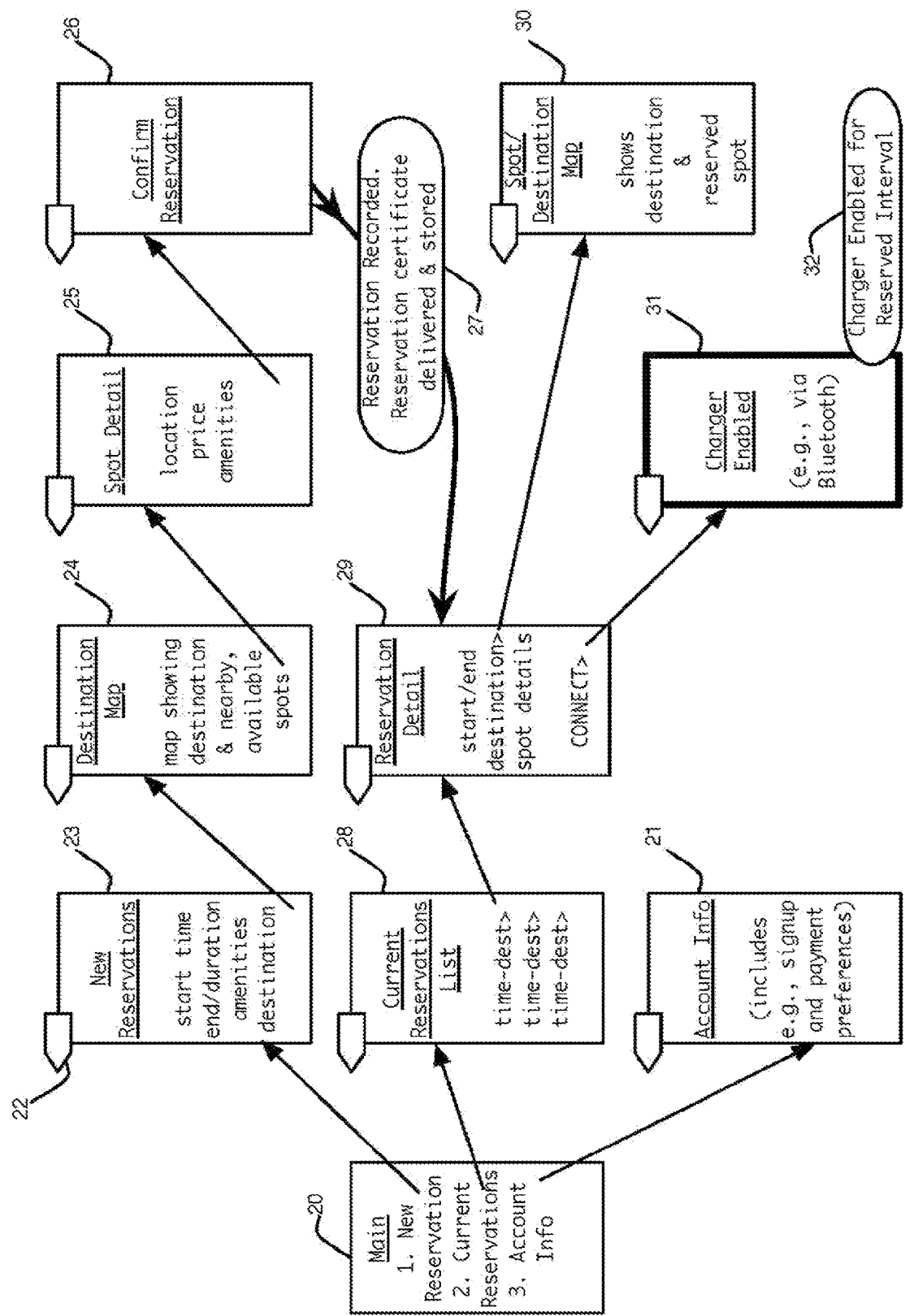
FIG. 7 shows a block diagram of an embodiment of a smart phone application.

In US Patent Application Publication 2007/0008181, Rollert et al. teach a "System and Method For Optimizing the Utilization Of Space," primarily parking spaces, by allowing a reservation to be made through the Internet. FIG. 7 shows how the present invention represents an improvement to the system and method of Rollert et al., enabled by a smart phone application that could, for example, run on an iPhone by Apple, Inc. of Cupertino, Calif. or other smart phone.

Such an application would have a various screen views for performing such functions as making a new reservation, examining current reservations, and maintaining the patron's account. Some portions of the application require connectivity to the Internet to operate, but other portions may operate based on locally stored information. A few related operations, including examining current reservations, should be able to operate without Internet access, as the user may require immediate access to these operations, but be in a location such as in a parking garage where Internet access such as cell communication or Wi-Fi may not be provided.

In the diagram of FIG. 7, a main application view 20 is shown to offer three options: New Reservation (for creating a new reservation), Current Reservations (for examining and using reservations already made), and Account Info (for creating and editing appropriate account information). FIG. 7 shows a smart phone application block diagram for an embodiment in which Internet device 2 and smart phone 4 are the same device: In another embodiment, the reservation-making portion of the application may run on Internet device 2 and the current reservation portion of the application may run on the smart phone 4.

The patron would have selected the Account Info 21 at least once to create or otherwise associate an account with the patron's smart phone 4. An account may have associated payment preferences and perhaps acceptance of legal agreements. Payment preferences might include a credit card account, or a bank account. Another payment preference would provide permission to pre-charge a patron's credit card or bank account and subsequently allow the system to operate using micropayments made against that pre-charge amount. The parking reservation server 15 (or web site 12) or another server with which it has communication (not shown) would maintain the micropayment accounts for each patron and apply their funds to charges for parking. The micropayment accounts would be settled daily or with a different period, or whenever the pre-charged amount has been consumed.

Once the patron's account has been enabled, the patron can access the views for creating a new reservation.

The New Reservations 23 screen accepts a start-time, an end-time (or duration), and a destination.

Required amenities can be selected, including for the present invention, available charging for an EV (which may further include a selection for Level 1 or Level 2 charging, for instance). The destination may be an actual parking location, but more commonly (and as illustrated herein) it is the patron's destination for which nearby parking is sought.

As with each screen in this diagram other than the Main view 20, there is a 'back' arrow 22 atop the screen including the New Reservations screen 23. The back arrow 22 is a user interface element that permits the patron to move back up the hierarchy to access screens and their interfaces higher up.

Once a destination has been entered into the New Reservation screen 23, the user may be presented with the Destination Map screen 24 showing a map with the destination marked and parking spots nearby shown and selectable. The spots shown may be only ones having the stated amenities and that are available to be reserved for the interval entered such as beginning from the start-time and available for the duration or until the end-time. Current information regarding parking spot availability requires communication with the server responsible for maintaining reservations for that spot, which may be server 15, web site 12, or some other server.

Alternatively, the spots may be shown in a list, which may be sorted by their distance from the indicated destination, or by price, or a combination thereof.

The patron selects a parking spot, whether from a corresponding marking on the map, or from the spot list (not shown). Once selected, the Spot Detail screen 25 is shown, which includes information such as location, pricing, detailed amenities, and perhaps a picture of the specific parking location (or one representative of it).

If the patron does not like the parking spot presented, the back buttons allow returning to screens earlier in the interaction to make different selections, e.g., to choose a different spot or alter the start-time, etc.

If the patron does like the parking spot presented, he can confirm the reservation 26, which initiates a reservation request to the server. Upon successfully obtaining a reservation for an EV charging enabled parking location, the server in response can provide or authenticate 27 a reservation certificate 5 to be stored in the smart phone 4. For instance, in one embodiment, reservation certificate 5 comprises data representative of the reservation encrypted with the server's private key. In another embodiment, reservation certificate 5 comprises a digital signature by the server that authenticates data representative of the reservation. The completion of the reservation transitions the patron to a different region of the application screen hierarchy, and instead of being in the 'new reservation' branch (23-26), the interface jumps to a location in the current reservations' branch (28-31), such as the Reservation Detail page 29, showing the reservation just made.

Another way of getting to the Reservation Detail screen 29 begins back on the Main application view 20 when the patron selects the current reservations option. Upon doing this, the Current Reservations List 28 is shown, which lists all pending parking reservations, for example in order of the date and time at which the reservation starts. Besides the start time, each entry in the list should show some additional information to remind the patron of each instance, for example the destination may be presented.

Upon selecting one of the reservations from the Current Reservations List 28, the corresponding Reservation Detail screen 29 is shown, listing the same details that were selected and known when the reservation was made. Clicking on the destination entry on this screen can bring up a Spot/Destination Map screen 30, showing the location of the parking spot with respect to the destination.

The Reservation Detail screen 29 also presents a connect option to direct the smart phone application to attempt communication with the EV charging system 4 (or other parking spot amenity system or access device 11, e.g., a hotel room lock) and to provide the reservation certificate 5 to the charger 6 or device (11), thereby enabling it 32 for the interval of the reservation.

The Charger Enabled screen 31 can be used to monitor the connection attempt and confirm activation resulting from a successful connect action, and may also initiate a timer (not shown) on the smart phone to generate an alert as the parking interval is about to expire.

Several descriptions and illustrations have been presented to aid in understanding the features of the present invention. One skilled in the art will realize that numerous changes and variations are possible without departing from the spirit of the invention. Each of these changes and variations is within the scope of the present invention.

What is claimed is:
1. An access control system comprising:
a) an access device comprising a short-range wireless communication module connected to a processor having control of a door lock;

b) a secure reservation interface to receive a reservation request for a reservation at a given destination, the reservation interface comprising one or more screens for receiving a selection of at least an interval of the reservation;

c) a reservation server, in communication with the reservation interface and a network, to:
   receive the reservation request for the destination, the reservation request including at least the interval of the reservation;
   issue a reservation certificate comprising the interval of the reservation based on at least the reservation request;
   transmit, via the network, from the reservation server to a smartphone, at least the reservation certificate and a short-range wireless communication setting corresponding to the access device;

d) a smartphone application installed on the smartphone to receive the reservation certificate and the communication setting corresponding to the access device, wherein the smartphone application comprises a transmission module that wirelessly transmits the reservation certificate to the access device using the short-range wireless communication setting when the smartphone on which the smartphone application is installed is within short-range wireless transmission distance of the access device; and e) wherein the access device receives the reservation certificate from the smartphone application based on use by the smartphone application of the short-range wireless communication setting, and the processor activates the door lock based on at least the receipt of the reservation certificate.

2. The system of claim 1 wherein the access device comprises a unique identifier, and wherein at least the reservation certificate or the communication setting contains the unique identifier.

3. The system of claim 2 wherein at least a portion of the reservation certificate is encrypted.

4. The system of claim 1 wherein the smartphone application comprises an interface, and wherein the smartphone application interface comprises a status of the door lock.

5. The system of claim 1 wherein the reservation certificate comprises information indicative of a reservation duration.

6. The system of claim 1 wherein the reservation server identifies one or more available amenities associated with the destination and transmits the one or more identified available amenities to the smartphone.

7. The system of claim 6 wherein the smartphone application displays an interface comprising the one or more identified available amenities associated with the destination.

8. The system of claim 7 wherein the smartphone application receives an indication of a selection of the one or more identified available amenities displayed on the interface.

9. The system of claim 8 wherein the smartphone application further comprises one or more payment preferences, including at least one of a credit card, and wherein the one or more payment preferences are used by the smartphone application to authorize charges associated with the one or more selected available amenities.

10. The system of claim 1 wherein the smartphone application comprises an interface, and wherein the interface comprises a map.

11. The system of claim 1 wherein the smartphone application transmission module wirelessly transmits the reservation certificate to a wireless device distinct from the access device.

12. The system of claim 1 wherein the short-range wireless communication setting comprises a Bluetooth short-range wireless communication setting.

13. The system of claim 1 wherein the reservation certificate is automatically removed from the smartphone application at a time after the reservation interval.

14. An access device comprising
   a door lock;
   a processor in communication with and having control of the door lock;
   a wireless communication module connected to the processor for communication with a wireless device; and
   a memory, accessible by the processor, in which a parameter for the operation of the access device is stored;
   wherein the processor receives a digital certificate via the wireless communication module from the wireless device, the digital certificate comprising an interval of a reservation associated with a given destination and an update for the parameter; and
   wherein the processor updates the parameter in accordance with the digital certificate.

15. The access control system of claim 14 wherein the parameter is a unique ID associated with the access device.

16. The access control system of claim 15 wherein the digital certificate further allows access and the processor updates the unique ID after access has been allowed.

17. The access control system of claim 15 wherein the digital certificate further allows access and the processor updates the unique ID after access is complete.

18. The access control system of claim 14 wherein the parameter is an encryption decoding key of the access device.

19. The access control system of claim 18 wherein the digital certificate further allows access and the processor updates the encryption decoding key for use with a subsequent digital certificate.

20. The access control system of claim 19 wherein the processor updates the parameter for a time period corresponding to the interval of the reservation.

* * * * *